United States Patent
Zhao (10) Patent No.: US 12,100,388 B2
(45) Date of Patent: Sep. 24, 2024

(54) METHOD AND APPARATUS FOR TRAINING SPEECH RECOGNITION MODEL, ELECTRONIC DEVICE AND STORAGE MEDIUM

(71) Applicant: Beijing Baidu Netcom Science Technology Co., Ltd., Beijing (CN)

(72) Inventor: Qingen Zhao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 254 days.

(21) Appl. No.: 17/747,732

(22) Filed: May 18, 2022

(65) Prior Publication Data
US 2022/0277732 A1 Sep. 1, 2022

(30) Foreign Application Priority Data
Sep. 28, 2021 (CN) ............ 202111146371.7

(51) Int. Cl.
*G10L 15/06* (2013.01)
*G10L 15/02* (2006.01)
(Continued)

(52) U.S. Cl.
CPC ............ *G10L 15/063* (2013.01); *G10L 15/02* (2013.01); *G10L 15/16* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 7,885,812 B2 * | 2/2011 | Acero ............ | G10L 15/063 704/251 |
| 2020/0294488 A1 | 9/2020 | Li et al. | |
| 2022/0172707 A1 * | 6/2022 | Wang ............ | G10L 15/063 |

FOREIGN PATENT DOCUMENTS

| CN | 110176226 A | 8/2019 |
|---|---|---|
| CN | 110364144 A | 10/2019 |

(Continued)

OTHER PUBLICATIONS

Chinese Office Action for Chinese Application No. 202111146371.7, dated Apr. 1, 2022, 6 pages.
(Continued)

*Primary Examiner* — Antim G Shah
(74) *Attorney, Agent, or Firm* — Seed IP Law Group LLP (57) ABSTRACT

A method and apparatus for training a speech recognition model, an electronic device and a storage medium are provided. An implementation of the method may include: determining a plurality of feature vectors based on audio feature data corresponding to a first target frame in a sample speech, wherein the sample speech comprises a conversation among a plurality of objects and the sample speech has a corresponding sample text; generating a predicted text element corresponding to the first target frame based on an adjacent text element preceding to a text element corresponding to the first target frame in the sample text, wherein the text element and the adjacent text element are targeting at a target object in the plurality of objects; obtaining a first target text element based on the predicted text element and a first feature vector in the plurality of feature vectors; and adjusting the speech recognition model based on the first target text element and the sample text, to obtain a trained speech recognition model.

13 Claims, 5 Drawing Sheets

(51) Int. Cl.
*G10L 15/16* (2006.01)
*G10L 15/22* (2006.01)

(56) References Cited

FOREIGN PATENT DOCUMENTS

| | | |
|---|---|---|
| CN | 110473531 A | 11/2019 |
| CN | 110838286 A | 2/2020 |
| CN | 113129868 A | 7/2021 |
| CN | 113129870 A | 7/2021 |
| EP | 3 709 115 A1 | 9/2020 |
| JP | 2007-65491 A | 3/2007 |
| WO | 2020/0283110 A1 | 4/2020 |

OTHER PUBLICATIONS

Stanton et al., "Predicting Expressive Speaking Style From Text in End-to-End Speech Synthesis," IEEE, 2018, pp. 595-602.
Wang, "Research on Chinese Spoken Term Detection Based on Deep Learning," China Academic Journal Electronic Publishing House, Jun. 2015, 69 pages.
Sklyar et al., "Streaming Multi-Speaker ASR with RNN-T," Feb. 19, 2021, 5 pages.

\* cited by examiner

METHOD AND APPARATUS FOR TRAINING SPEECH RECOGNITION MODEL, ELECTRONIC DEVICE AND STORAGE MEDIUM

CROSS-REFERENCE TO RELATED APPLICATIONS

This application claims priority to Chinese Patent Application No. 202111146371.7, filed with the China National Intellectual Property Administration (CNIPA) on Sep. 28, 2021, the content of which is incorporated herein by reference in its entirety.

TECHNICAL FIELD

The present disclosure relates to the technical field of computers, in particular to a method and apparatus for training a speech recognition model, a method and apparatus for processing speech data, an electronic device and a storage medium in the fields of speech technology and deep learning.

BACKGROUND

With the advancement of technology, speech data is increasingly used in various existing applications. In many scenarios, there will be speech data that needs to be processed. For example, in customer services, conferences, or other multi-person dialog scenarios, there will be a large number of speech files. The speech files are usually monophonic, that is, an audio file contains voices of at least two speakers. With the increase of application scenarios, more and more audio data needs to be processed. However, there are still many problems to be solved in the processing of audio data.

SUMMARY

Embodiments of the present disclosure provide a method and apparatus for training a speech recognition model, an electronic device and a storage medium.

In a first aspect, some embodiments of the present disclosure provide a method for training a speech recognition model. The method includes: determining a plurality of feature vectors based on audio feature data corresponding to a first target frame in a sample speech, wherein the sample speech comprises a conversation among a plurality of objects and the sample speech has a corresponding sample text; generating a predicted text element corresponding to the first target frame based on an adjacent text element preceding to a text element corresponding to the first target frame in the sample text, wherein the text element and the adjacent text element are targeting at a target object in the plurality of objects; obtaining a first target text element based on the predicted text element and a first feature vector in the plurality of feature vectors; and adjusting the speech recognition model based on the first target text element and the sample text, to obtain a trained speech recognition model.

In a second aspect, some embodiments of the preent disclousre provice a method for processing speech data. The method includes: obtaining a speech to be recognized; extracting audio feature data for at least one frame in the speech to be recognized; and applying the audio feature data to the speech recognition model trained based on the method according to the first aspect, to determine a text corresponding to the speech to be recognized.

In a third aspect, some embodiments of the present disclosre provide an apparatus for training a speech recognition model. The apparatus includes: a feature vector obtaining module, configured to determine a plurality of feature vectors based on audio feature data corresponding to a first target frame in a sample speech, wherein the sample speech comprises a conversation among a plurality of objects and the sample speech has a corresponding sample text; a text element application module, configured to generate a predicted text element corresponding to the first target frame based on an adjacent text element preceding to a text element corresponding to the first target frame in the sample text, wherein the text element and the adjacent text element are targeting at a target object in the plurality of objects; a target text element obtaining module, configured to obtain a first target text element based on the predicted text element and a first feature vector in the plurality of feature vectors; an adjustment module, configured to adjust the speech recognition model based on the first target text element and the sample text, to obtain a trained speech recognition model.

In a fourth aspect, some embodiments of the present disclousre provide an apparatus for processing speech data. The apparatus inlcudes: a speech obtaining module, configured to obtain a speech to be recognized; an extraction module, configured to extract audio feature data for at least one frame in the speech to be recognized; and a text determination module, configured to apply the audio feature data to the speech recognition model trained based on the method according to any one of claims 1-8, to determine a text corresponding to the speech to be recognized.

In a fifth aspect, some embodiments of the present disclosure provide an electronic deivce. The electronic device includes: at least one processor; and a memory connected to the at least one processor by communication, where the memory stores instructions executable by the at least one processor, and the instructions, when executed by the at least one processor, cause the at least one processor to perform the method according to the first or second aspects.

In a sixth aspect, some embodiments of the present dislcousre provide a non-transitory computer-readable storage medium storing computer instructions, wherein the computer instructions, when executed by a computer, cause the computer to perform the method according to the first or second aspects.

In a seventh aspect, some embodiments of the present disclosure provide a computer program product, according to the first or second aspects.

It should be understood that the content described in this part is not intended to identify key or important features of embodiments of the present disclosure, nor is it used to limit the scope of the present disclosure. Other features of the present disclosure will be easily understood by the following description.

BRIEF DESCRIPTION OF THE DRAWINGS

The accompanying drawings are used for better understanding of this solution, and do not constitute limitations to the present disclosure.

DETAILED DESCRIPTION OF EMBODIMENTS

Example embodiments of the present disclosure are described below with reference to the accompanying drawings, where various details of embodiments of the present disclosure are included to facilitate understanding, and should be considered merely as examples. Therefore, those of ordinary skills in the art should realize that various changes and modifications may be made to embodiments described herein without departing from the scope and spirit of the present disclosure. Similarly, for clearness and conciseness, descriptions of well-known functions and structures are omitted in the following description.

In the description of embodiments of the present disclosure, the term "including" and similar terms should be understood as open inclusion, that is, "including but not limited to". The term "based" should be understood as "based at least in part". The term "an embodiment" or "the embodiment" should be understood as "at least one embodiment". The terms "first", "second", etc. may refer to different or the same objects. Other explicit and implicit definitions may also be included below.

As mentioned above, in customer services, conferences, or other multi-person dialog scenarios, the speech files are usually monophonic, that is, an audio file contains voices of at least two speakers, and sometimes, two or more people speak at the same time, which will bring difficulties to subsequent transcription (audio to text transcription), where speakers' characteristicsvary, and audio frequencies overlap, that is, a cocktail party effect occurs. As a result, the text cannot be distinguishined accroding to speakers to realize speaker diarization.

Generally, speaker separation may be perormed on an audio first, and then speech transcription is performed on the audio obtained after the spearker separation, so as to obtain texts with speakers thereof being distinguished.

Traditionally, the spearker spearation algorithms for processing speech include time delay neural networks (TDNN)-xvector and agglomerative hierarchical clustering (AHC), and further include some end-to-end frameworks. The speech transcription includes traditional GMM-HMM, DNN-HMM, and some end-to-end frameworks RNN-T, LAS, LSTM-CTC, etc.

However, for the above traditional solutions, the process is cumbersome and not end-to-end, the training and testing processes may not match, and the separation effect is not ideal in the case where speakers' voice overlap occurs. Further, the speech transcription system does not distinguish between speaker characteristics during the transcrition. In an audio multi-speaker scenario, the recognition accuracy will be affected, the transcription cannot be performed according to the speakers, and semantic information is not used during the transcription.

In order to at least solve the above problems, an improved solution of a method for training a speech recognition model is proposed according to an embodiment of the present disclosure. In this solution, a computing device determines a plurality of feature vectors based on audio feature data corresponding to a first target frame in a sample speech that includes a conversation among a plurality of objects and has a corresponding sample text. Then, the computing device generates a predicted text element corresponding to the first target frame based on an adjacent text element preceding to a text element corresponding to the first frame in the sample text, where the text element and the adjacent text element are targeting at a target object in the plurality of objects. Next, a target text element is obtained based on the predicted text element and a first feature vector in the plurality of feature vectors. Finally, the speech recognition model is adjusted based on the target text element and the sample text to obtain a trained speech recognition model. Through this method, rapid recognition of multi-speaker speech is realized; and combined with semantic features, the recognition accuracy is improved, the calculation amount is saved, and the efficiency is improved.

Figure 1:
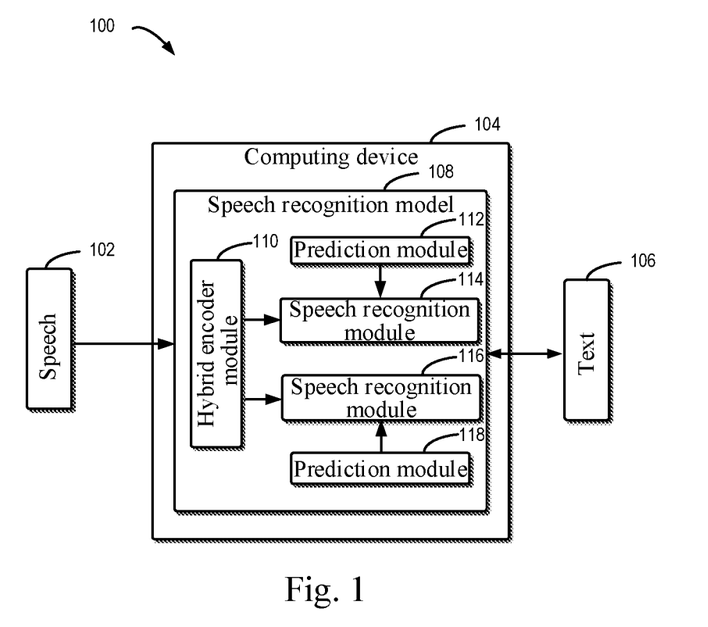
FIG. 1 shows a schematic diagram of an environment 100 in which multiple embodiments of the present disclosure can be implemented.

FIG. 1 shows a schematic diagram of an environment 100 in which multiple embodiments of the present disclosure may be implemented. The example environment 100 includes a computing device 104.

The computing device 104 may be configured to train a speech recognition model 108 and use the trained speech recognition model 108. FIG. 1 shows that the speech recognition model 108 is trained or used in the computing device 104, which is merely an example but not a limitation of the present disclosure. The speech recognition model 108 may reside on a number of different computing devices or be deployed on a cloud.

The computing device 104 includes, but is not limited to, a personal computer, a server computer, a hand-held or laptop device, a mobile device (such as a mobile phone, a personal digital assistant (PDA), or a media player), a multi-processor system, consumer electronics, a minicomputer, a mainframe computer, a distributed computing environment including any one of the above systems or devices, etc.

In some embodiments, the computing device 104 receives a sample speech while training the speech recognition model. The sample speech is obtained by performing speaker annotation on a received speech 102. A text content corresponding to the sample speech may also be obtained. Alternatively or additionally, in order to increase the diversity of the sample speech, the sample speech may also be pre-processed, including removing noise (such as ambient noise, busy tone, polyphonic ring tone, etc.) to obtain a clean audio. Additionally, data augmentation may also be performed. In an example, time warping, frequency masking, etc. are performed on the sample speech. The time warping refers to clearing audio information of several time periods in the audio, and the frequency masking refers to removing part of the frequency information.

Then, the sample speech is divided into frames. Features of each frame extracted, such as 80-dimensional Mel-Frequency Cepstral Coefficient (MFCC), Perceptual Linear Predictive (PLP) or filter bank (Fbank). The features of each frame are used as input to the speech recognition model.

Alternatively or additionally, features extracted directly from a frame is subjected to first-order differnece calculation, second-order difference calculation, and then regularization, i.e., normal distribution adjustment. In this way, 80*3-dimensional features are extracted from each frame of audio, respectively referred to as static feature, first-order difference feature, and second-order difference feature. Then the 80*3-dimensional features are used as input to the speech recognition model. The above example is only used to describe the present disclosure, but does not specifically limit the present disclosure.

In some embodiments, the sample text corresponding to the sample speech may also be pre-processed, including cleaning and normalizing symbols in the text, including removing special symbols, such as @*%, etc., regularizing digital unit symbols, for example, unifying 150, year 2010, and kg into Chinese characters, and then pre-training a prediction network.

In some embodiments, the speech 102 received by the computing device 104 is processed speech data, i.e., speech data including speech features.

The feature data of the speech is input to a hybrid encoder module 110. In some embodiments, the hybrid encoder module 110 may be composed of a plurality of convolutional neural network layers and one max-pooling layer. In other embodiments, a user may configure the hybrid encoder with any suitable structure. The above example is only used to describe the present disclosure, but does not specifically limit the present disclosure.

The hybrid encoder module 110 processes the received speech feature data to obtain intermediate features. In an example, the intermediate features include not only features of the speech content, but also speaker's information related to the speech content, such as speech rate, gender, and mood.

FIG. 1 shows that the hybrid encoder module 110 is connected to two speech recognition modules 114 and 116, the two speech recognition modules 114 and 116 have corresponding prediction modules 112 and 118. Therefore, there are two branches behind the hybrid encoder module, which is only an example, not a limitation of the present disclosure. The hybrid encoder module 110 may be connected to a plurality of speech recognition modules and a plurality of corresponding prediction modules. The numbers of speech recognition modules and corresponding prediction modules may be determined based on the number of speakers in the speech used for training. Taking FIG. 1 as an example, the speech recognition model is configured to process the speech between two speakers.

The hybrid encoder module 110 generates a plurality of intermediate features, the number of the intermetiate features is the same as the number of the speakers in the speech. The intermediate features are then provided to the speech recognition modules 114 and 116. For different speakers, the text part corresponding to a speaker in the sample text is applied to the prediction module which corresponds to the speaker, respectively. For example, the prediction module 112 is assigned to the first speaker in the speech 102, and the prediction module 118 is assigned to the second speaker in the speech 102. Taking the first speaker as an example, the text part corresponding to the speech of the first speaker has a plurality of text elements, where a text element refers to a word or a phrase. When the input of the audio frame corresponding to the first text element in the text part corresponding to the first speaker is completed, the first text element of the first speaker may be applied to the prediction module for predicting a text element corresponding to a next audio frame. For the second speaker, because the current audio frame does not correspond to the text of the second speaker, the prediction module corresponding to the second speaker is still in the initial state of inputting a text element and thus does not predict a text. The prediction module is a pre-trained model for predicting a subsequent text element based on a prededing text element. The prediction module may be trained with any suitable dialog corpus or text library.

The speech recognition module then determines whether to adjust the parameters of the speech recognition model based on the received intermediate features obtained from the sample speech and the received predicted text, and in combination with the sample text 106.

In some embodiments, the speech recognition module includes a vector mapping module for mapping the intermediate features to high-dimensional vectors in a higher-dimensional space. For example, the vector mapping module is a speaker dependent encoder composed of a plurality of time delay neural networks. Compared with the intermediate features, the high-dimensional vectors focus more on the content information in speech. The speech recognition module further includes a recognition encoder, a joint network, and a classifier (softmax). The recognition encoder is composed of a plurality of attention layers, and extracts the content information from the high-dimensional vectors obtained by the vector mapping module. The extracted content information and the text elements predicted by the prediction module are input into the joint network and then input into the classifier to obtain probabilities of all candidate text elements corresponding to the frame. For example, probabilities corresponding to a plurality of words are determined, such as, if the model is used to generate a Chinese character text corresponding to a speech, a probability corresponding to each of the all Chinese characters is determined; if the model is used to generate an English text corresponding to the speech, a probability corresponding to each of the all letters or words is determined. Then, based on the probabilities of multiple groups of candidate text elements obtained for multiple frames in the speech, and sample texts corresponding to the multiple frames, whether the speech recognition model needs to be adjusted is determined in combination with a loss function. If the speech recognition model needs to be adjusted, the training continues after the model is adjusted to obtain a trained speech recognition model.

In some embodiments, when the speech recognition model runs in the computing device 104, a speech to be processed may be received as an input, and after the speech is processed as above, feature information of frames in the speech is input into the speech recognition model to obtain a corresponding text. In this process, when a current frame is processed by the speech recognition module, text elements determined by the speech recognition module for a preceding frame before the current frame are input into the prediction module to predict text elements for the current frame, and then a target text element corresponding to the current frame is determined in combination with a feature vector of the current frame. For example, the text element having the highest probability obtained by the classifier of the speech recognition module is taken as the target text element corresponding to the current frame.

Through this method, rapid recognition of multi-person speech is realized; and combined with semantic features, the recognition accuracy is improved, the calculation amount is saved, and the efficiency is improved.

The environment 100 in which multiple embodiments of the present disclosure may be implemented is described above with reference to FIG. 1. A flowchart of a method 200 for training a speech recognition model according to some embodiments of the present disclosure is described below with reference to FIG. 2. The method 200 in FIG. 2 may be performed by the computing device 104 in FIG. 1 or any suitable computing device.

Figure 2:
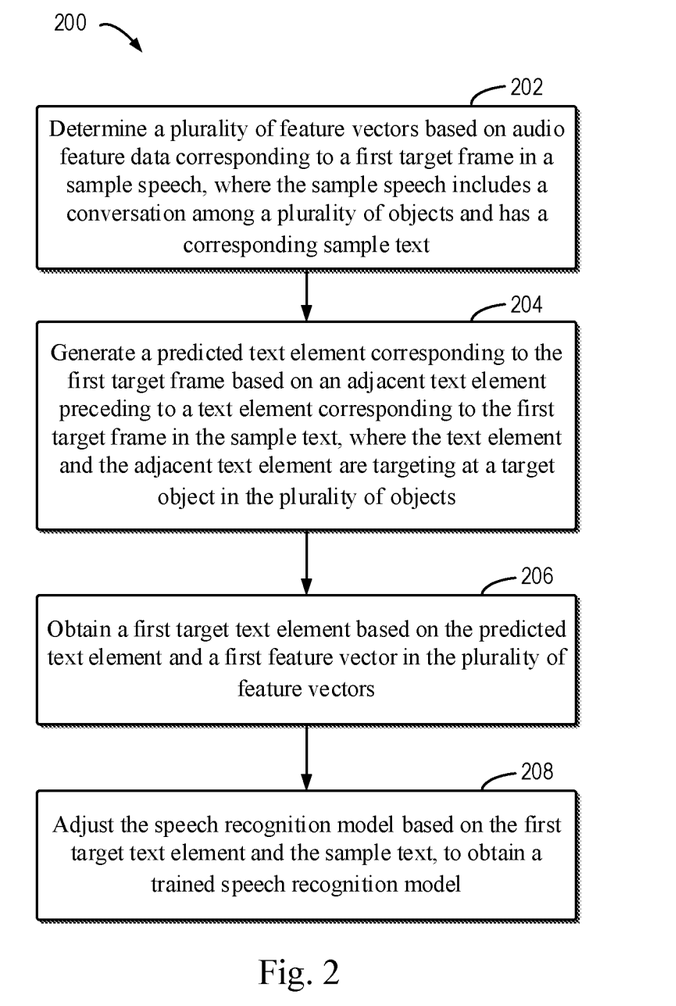
FIG. 2 shows a flowchart of a method 200 for training a speech recognition model according to some embodiments of the present disclosure.

In block 202, a plurality of feature vectors are determined based on audio feature data corresponding to a first target frame in a sample speech, where the sample speech includes a conversation among a plurality of objects and has a corresponding sample text. As shown in FIG. 1, the computing device 104 inputs the audio feature data corresponding to the first target frame in the sample speech obtained from the speech 102 into the hybrid encoder module to obtain the plurality of feature vectors.

In some embodiments, the speech recognition model includes a hybrid encoder module, a plurality of speech recognition modules, and a plurality of prediction modules. Through this model configuration, model training can be implemented rapidly. For example, the speech recognition model shown in FIG. 1 includes a hybrid encoder module 110, two speech recognition modules 114 and 116 and two prediction modules 112 and 118.

In some embodiments, the computing device 104 acquires a target speech. The computing device 104 annotates the target speech with identifiers of objects in the plurality of objects. Next, the computing device 104 pre-processes the annotated speech to obtain a sample speech, for example, performs noise removal, time warping, frequency masking, etc. The computing device 104 then extracts audio feature data of a first frame in the sample speech. In this way, the audio feature data can be quickly obtained.

In some embodiments, the computing device determines a sample text corresponding to the target speech. In this way, the sample text can be quickly obtained.

In some embodiments, the audio feature data is applied to the convolutional layer and pooling layer in the hybrid encoder module to obtain a plurality of feature vectors. For example, the feature vectors are intermediate vectors generated by the hybrid encoder module. Through this method, the intermediate vectors can be quickly obtained. In an example, the audio feature data is a feature vector corresponding to first target frame data, such as MFCC, PLP, or Fbank. In another example, the audio feature data is 80*3-dimensional feature data obtained by performing first-order difference calculation, second-order difference calcuIaiton and then regularization on the feature vectors of the data. The above example is only used to describe the present disclosure, but does not specifically limit the present disclosure.

In block 204, a predicted text element corresponding to the first target frame is generated based on an adjacent text element prededing to a text element corresponding to the first target frame in the sample text, the text element and the adjacent text element are targeting at a target object in the plurality of objects. For example, when the computing device 104 in FIG. 1 is training the speech recognition model, the text element prededing to the text content corresponding to the first target frame is used as the input of the prediction module, to predict the text element corresponding to the first target frame.

In some embodiments, the computing device 104 determines, in the sample text, a text element corresponding to the first target frame, and determines a target object corresponding to the text element, the target object being a speaker whose speech content includes the text element. At this time, because the sample speech and the sample text have been annotated with identifiers of speakers, the adjacent text element corresponding to the speaker and prededing to the text element can be determined from the sample text; and then the adjacent text element is applied to the first prediction module targeting at the speaker in the plurality of prediction models to generate the predicted text element. At training time, a prediction module is assigned to each speaker. In this way, text elements can be quickly and accurately predicted.

In block 206, a first target text element is obtained based on the predicted text element and a first feature vector in the plurality of feature vectors.

In some embodiments, the computing device 104 applies the first feature vector to a vector mapping module in the first speech recognition module, to obtain a high-dimensional vector. The vector mapping module may be a speaker dependent (SD) encoder. The computing device 104 applies the high-dimensional vector to a recognition encoder module of the first speech recognition module for recognizing text information. Then, the computing device generates the first target text element based on the text information and the predicted text element. In an example, the joint network receives the text information and the predicted text element. The joint network is connected to the classifier, the classifier then determines a probability of each text element in all text elements corresponding to the frame. The text element having the highest probability is used as the first target text element and input to the prediction module. Because the text corresponding to each frame is identified in the training process, the first target text element may be determined from the sample text for the prediction module. In this way, the first target text element can be quickly determined.

In block 208, the speech recognition model is adjusted based on the first target text element and the sample text, to obtain a trained speech recognition model.

In some embodiments, the computing device obtains probabilities of all text elements corresponding to the frame at the classifier. Therefore, the computing device obtains the first target text element and its corresponding probability, and at the same time, the computing device also obtains other text elements for the frame and their corresponding probabilities. Next, the computing device 104 also obtains a second target text element corresponding to the second frame in the sample speech, a probability of the second target text element, and probabilities corresponding to other text elements among all the text elements. Then, the speech recognition model is adjusted based on the first target text element, the second target text element and the sample text. For example, a predetermined number of probability sets will be obtained for the predetermined number of frames, each probability set including probabilities of all text elements corresponding to each frame. The value of a loss function is then calculated based on the plurality of probability sets and the text for the predetermined number of frames. According to this manner, the values of the loss functions of other branches connected to the hybrid encoder module are also calculated. The values of the loss functions for the plurality of speech recognition modules are summed to determine whether to continue adjusting the speech recognition model. For example, the values of the loss functions are compared with a predetermined threshold. If a predetermined condition is satisfied, no adjustment is performed; otherwise, an adjustment is performed. For example, if the values of the loss functions are greater than the predetermined threshold, no further adjustment is performed; and if the values of the loss functions are less than the predetermined threshold, an adjustment is performed.

Through this method, rapid recognition of multi-person speech is realized; and combined with semantic features, the recognition accuracy is improved, the calculation amount is saved, and the efficiency is improved.

The flowchart of the method 200 for training a speech recognition model according to some embodiments of the present disclosure is described above with reference to FIG. 2. A schematic diagram of a system 300 for training a speech recognition model is described below with reference to FIG. 3.

Figure 3:
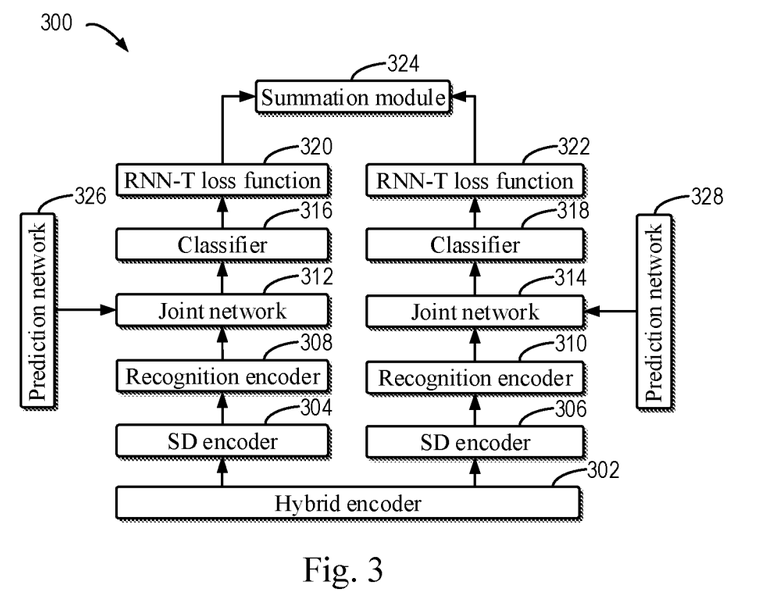
FIG. 3 shows a schematic diagram of a system 300 for training a speech recognition model according to some embodiments of the present disclosure.

A hybrid encoder 302 is composed of a plurality of convolutional neural networks and a max-pooling layer, and its overall input is audio features, such as 80-dimensional MFCC, which are then subjected to first-order difference calculation and second-order difference calculation and regularization, i.e., normal distribution adjustment, and then are input to three channels of the CNNs. Then SD encoders 304 and 306 output advanced feature vectors V with speaker characteristic information. The SD encoders 304 and 306 each is composed of a plurality of time delay neural networks (TDNNs).

Recognition encoders 308 and 310 each is composed of a plurality of attention layers, prediction networks 326 and 328 each is composed of a plurality of BLSTM layers, and joint networks 312 and 314 each is composed of a fully connected layer and a tanh activation layer. The outputs of classifiers 316 and 318 are probabilities corresponding to text units (characters or words). Training policies are sequence-related. In addition, the system 300 further includes RNN-T loss functions 320 and 322.

The recognition encoders 308 and 310 is configured to extract content information from the feature vectors, and attention layers of the encoders 308 and 310 focus on the importance relationship between features, highlight more important features, and extract more discriminative features. The prediction networks 326 and 328 predict and calculate current text information in combination with the historical text content of the corresponding speaker, where the input is the historical text, and the output is the predicted text information, so that semantically related information is fully used for assisted recognition. For example, the prediction network may be a bidirectional long short-term memory network (BLSTM), which is capable of learning the correlation of features with a larger time span.

The overall training is sequence-related, that is, in the input speech, which speaker speaks first, then the corresponding text is annotated as the SD encoder 304 branch, and the speaker who speaks later corresponds to the SD encoder 306 branch, and the prediction networks are also speaker dependent.

During training, the sample speech is divided into frames; features, such as 80-dimensional MFCC, PLP or Fbank, are extracted from each frame; and after first-order differernce calculation and second-order difference calculation and then regularization, i.e., normal distribution adjustment, 80*3-dimensional features are extracted from each audio frame, respectively referred to as static feature, first-order difference feature, and second-order difference feature.

The static feature, first-order difference feature, and second-order difference feature are input into the hybrid encoder 302, corresponding to the three channels of the corresponding CNN, and intermediate features are obtained and then input into the SD encoders 304 and 306 respectively, so as to extract advanced feature vectors V1, V2 . . . Vx having speaker features, where x is a positive integer.

The advanced feature vectors V1, V2 . . . Vx are input to the recognition encoders 308 and 310 respectively, to extract corresponding content-related feature vectors C1, C2, . . . Cx; then according to the speaking sequence of different speakers in the input audio, corresponding historical texts (text annotations) are input into the prediction networks 326 and 328 respectively, and currently predicted text information T1, T2, . . . Tx is calculated.

Next, the computing device 104 inputs Cx combined with Tx into the joint networks, the Cx combined with Tx are classified by the classifiers 316 and 318, then the RNN-T loss of each branch is calculated, all the losses are summed by a summation module 324, network parameters are reversely updated according to the stochastic gradient descent (SGD) criterion, and such processing is iterated for a plurality of rounds until the obtained speech recognition model converges, so that the speech recognition model of speaker separation is obtained.

During using this model, after the audio features of a piece of speech are extracted, the audio features are input into the hybrid encoder, the SD encoders, and the recognition encoders for forward calculation, the input of the prediction networks is a historical recognition result, the current prediction information is calculated. The current prediction information, combined with Cx, are then input into the joint networks and the classifiers respectively, and then the text content corresponding to each speaker can be obtained.

Through this method, rapid recognition of multi-person speech is realized; and combined with semantic features, the recognition accuracy is improved, the calculation amount is saved, and the efficiency is improved.

The schematic diagram of the system 300 for training a speech recognition model according to some embodiments of the present disclosure is described above with reference to FIG. 3. A flowchart of a method 400 for processing speech data is described below with reference to FIG. 4. The method 400 in FIG. 4 may be performed by the computing device 104 in FIG. 1 or any suitable computing device.

Figure 4:
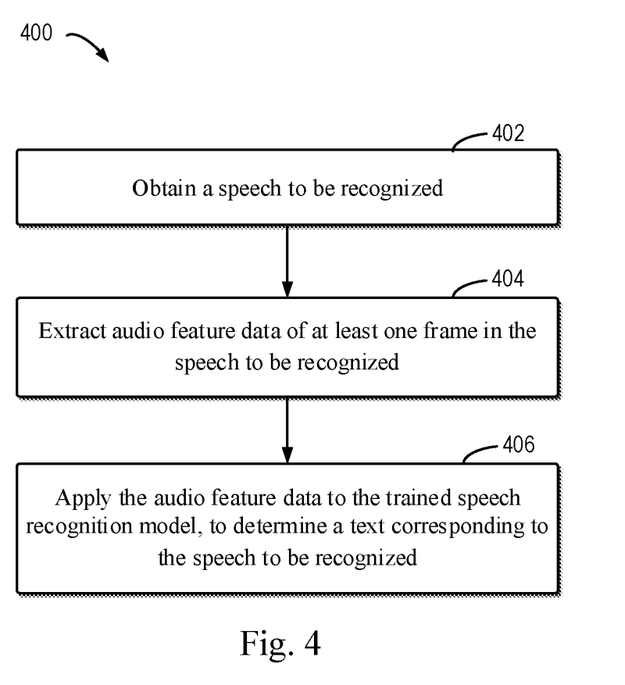
FIG. 4 shows a flowchart of a method 400 for processing speech data according to some embodiments of the present disclosure.

In block 402, a speech to be recognized is obtained. For example, the computing device 104 obtains the speech to be recognized for processing. Then, predetermined processing is performed on the speech to be recognized. Next, the speech to be recognized is divided into frames.

In block 404, audio feature data of at least one frame in the speech to be recognized is extracted. The computing device 104 extracts audio feature data of each of the at least one frame, such as an MFCC feature. This feature is then pre-processed to obtain features of more dimensions.

In block 406, the audio feature data is applied to the speech recognition model trained by the aforementioned method 200 to determine a text corresponding to the speech to be recognized. The computing device 104 applies the audio features to the speech recognition model 108 to obtain a corresponding text.

Through this method, rapid recognition of multi-person speech is realized; and combined with semantic features, the recognition accuracy is improved, the calculation amount is saved, and the efficiency is improved.

Figure 5:
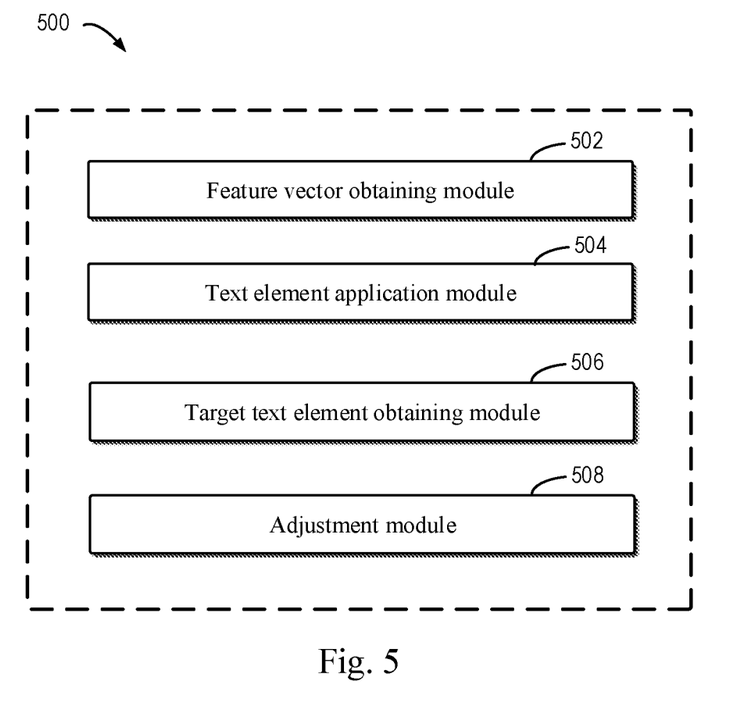
FIG. 5 shows a schematic diagram of an apparatus 500 for training a speech recognition model according to some embodiments of the present disclosure.

FIG. 5 shows a schematic block diagram of an apparatus 500 for training a speech recognition model according to an embodiment of the present disclosure. The speech recognition model includes a hybrid encoder module, a plurality of speech recognition modules and a plurality of prediction modules. As shown in FIG. 5, the apparatus 500 includes: a feature vector obtaining module 502, configured to determine a plurality of feature vectors based on audio feature data corresponding to a first target frame in a sample speech, wherein the sample speech comprises a conversation among a plurality of objects and the sample speech has a corresponding sample text; a text element application module 504, configured to generate a predicted text element corresponding to the first target frame based on an adjacent text element preceding to a text element corresponding to the first target frame in the sample text, wherein the text element and the adjacent text element are targeting at a target object in the plurality of objects; a target text element obtaining module 506, configured to obtain a first target text element based on the predicted text element and a first feature vector in the plurality of feature vectors; and an adjustment module 508, configured to adjust the speech recognition model based on the first target text element and the sample text, to obtain a trained speech recognition model.

In some embodiments, the speech recognition model includes a hybrid encoder module, a plurality of speech recognition modules, and a plurality of prediction modules.

In some embodiments, the feature vector obtaining module 502 includes: an audio feature data application module, configured to apply the audio feature data to convolutional layer and pooling layer in the hybrid encoder module, to obtain the plurality of feature vectors.

In some embodiments, the text element application module 504 includes: a target object determination module, configured to determine, in the sample text, the text element corresponding to the first target frame, and determine the target object corresponding to the text element; an adjacent text element determination module, configured to determine, in the sample text, the adjacent text element corresponding to the target object and preceding to the text element not corresponding to the target object; and a generation module, configured to apply the adjacent text element to a first prediction module in the plurality of prediction modules, to generate the predicted text element.

In some embodiments, the target text element obtaining module 506 includes: a high-dimensional vector obtaining module, configured to apply the first feature vector to a vector mapping module in a first speech recognition module in the plurality of speech recognition modules, to obtain a high-dimensional vector; a text information recognition module, configured to apply the high-dimensional vector to a recognition encoder module in the first speech recognition module, for recognizing text information; and a target text element generation module, configured to generate the first target text element based on the text information and the predicted text element.

In some embodiments, the adjustment module 508 includes: a second text element obtaining module, configured to obtain a second target text element corresponding to a second target frame in the sample speech; and a model adjustment module, configured to adjust the speech recognition model based on the first target text element, the second target text element, and the sample text.

In some embodiments, the apparatus 500 further includes: a speech obtaining module, configured to obtain a target speech; an annotation module, configured to annotate the target speech with identifiers of objects in the plurality of objects; a pre-processing module, configured to pre-process the annotated speech to obtain the sample speech; and an extraction module, configured to extract the audio feature data of the first frame in the sample speech.

In some embodiments, the apparatus 500 further includes a sample text determination module configured to determine a sample text corresponding to the target speech.

Figure 6:
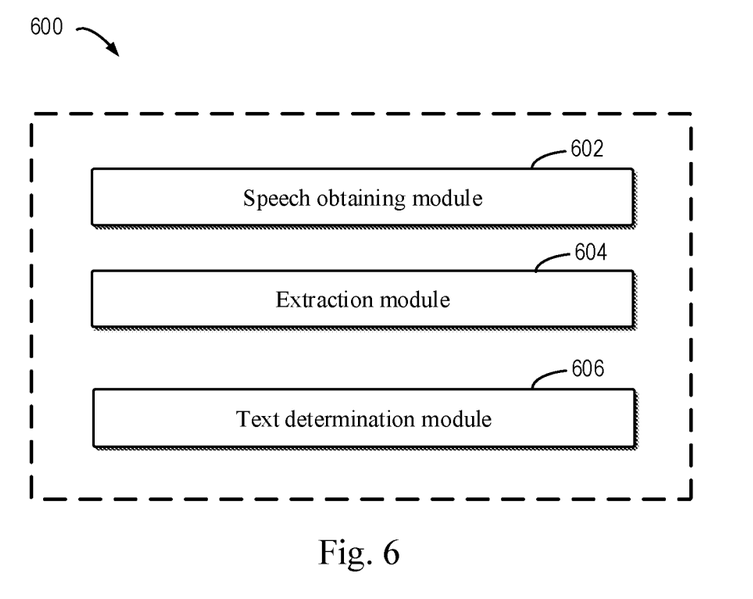
FIG. 6 shows a schematic diagram of an apparatus 600 for processing speech data according to some embodiments of the present disclosure.

FIG. 6 shows a schematic block diagram of an apparatus 600 for processing speech data according to an embodiment of the present disclosure. As shown in FIG. 6, the apparatus 600 includes a speech obtaining module 602, configured to obtain a speech to be recognized; an extraction module 604, configured to extract audio feature data for at least one frame in the speech to be recognized; and a text determination module 606, configured to apply the audio feature data to the speech recognition model trained based on the apparatus shown in FIG. 5, to determine a text corresponding to the speech to be recognized.

In the technical solution of the present disclosure, the acquisition, storage and application of user's personal information involved are all in compliance with the provisions of relevant laws and regulations, and do not violate public order and good customs.

According to embodiments of the present disclosure, an electronic device, a readable storage medium, and a computer program product are also provided.

Figure 7:
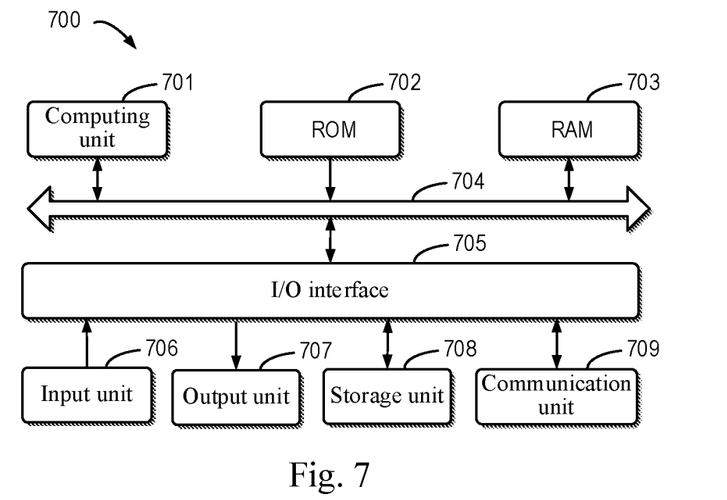
FIG. 7 shows a block diagram of a device 700 capable of implementing multiple embodiments of the present disclosure.

FIG. 7 shows a schematic block diagram of an exemplary electronic device 700 that may be used to implement embodiments of the present disclosure. The exemplary electronic device 700 may be used to implement the computing device 104 in FIG. 1. The electronic device is intended to represent various forms of digital computers, such as a laptop, a desktop, a worktable, a personal digital assistant, a server, a blade server, a mainframe computer, and other suitable computers. The electronic device may also represent various forms of mobile devices, such as a personal digital assistant, a cellular phone, a smart phone, a wearable device, and other similar computing devices. The components shown herein, their connections and relationships, and their functions are by way of example only, and are not intended to limit implementations of the present disclosure described and/or claimed herein.

As shown in FIG. 7, the device 700 includes a computing unit 701, which may perform various appropriate operations and processes based on computer programs stored in a read-only memory (ROM) 702 or computer programs loaded from a storage unit 708 to a random access memory (RAM) 703. The RAM 703 may also store various programs and data required by the operations of the device 700. The computing unit 701, the ROM 702, and the RAM 703 are connected to each other by a bus 704. An input/output (I/O) interface 705 is also connected to the bus 704.

A plurality of components in the device 700 are connected to the I/O interface 805, including: an input unit 706, e.g., a keyboard, a mouse, etc.; an output unit 707, e.g., various types of displays, speakers, etc.; a storage unit 708, e.g., a magnetic disk, an optical disk, etc.; and a communication unit 709, e.g., a network card, a modem, a wireless communication transceiver, etc. The communication unit 709 allows the device 700 to exchange information/data with other devices over a computer network such as the Internet and/or various telecommunication networks.

The computing unit 701 may be a variety of general-purpose and/or dedicated processing components with processing and computing capabilities. Some examples of the computing unit 701 include, but are not limited to, a central processing unit (CPU), a graphics processing unit (GPU), various specialized artificial intelligence (AI) computing chips, various computing units that run machine learning model algorithms, a digital signal processor (DSP), and any suitable processor, controller, microcontroller, etc. The computing unit 701 executes the various methods and processes described above, such as the methods 200 and 400. For example, in some embodiments, the methods 200 and 400 may be implemented as a computer software program that is tangibly contained in a machine readable medium, such as the storage unit 708. In some embodiments, some or all of the computer program may be loaded and/or installed to the device 700 via the ROM 702 and/or the communication unit 709. When the computer program is loaded to the RAM 703 and executed by the computing unit 701, one or more steps of the methods 200 and 400 described above may be executed. Alternatively, in other embodiments, the computing unit 701 may be configured to perform the methods 200 and 400 by any other suitable means (e.g., by means of firmware).

Various embodiments of the systems and techniques described herein above may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), computer hardware, firmware, software, and/or combinations thereof. The various embodiments may include being implemented in one or more computer programs executable and/or interpretable on a programmable system including at least one programmable processor. The programmable processor may be a special-purpose or general-purpose programmable processor, and may receive data and instructions from a storage system, at least one input device, and at least one output device, and transmit data and instructions to the storage system, the at least one input device, and the at least one output device.

Program codes for implementing the method of the present disclosure may be written in one programming language or any combination of more programming languages. The program codes may be provided to a processor or controller of a general purpose computer, a special purpose computer or other programmable data processing apparatus, so that the program codes, when executed by the processor or controller, cause the functions/operations specified in the flowcharts and/or block diagrams to be implemented. The program codes may be completely executed on a machine, partially executed on a machine, partially executed on a machine and partially executed on a remote machine as a separate software package, or completely executed on a remote machine or a server.

In embodiments of the present disclosure, the machine readable medium may be a tangible medium that may contain or store programs used by a command execution system, apparatus or device or incorporated thereto. The machine-readable medium may be a machine-readable signal medium or a machine-readable storage medium. The machine-readable medium may include, but is not limited to, electric, magnetic, optical, electromagnetic, infrared, or semiconductor systems, apparatuses, devices, or a combination of any of the above. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), a fiber, a portable compact disk read-only memory (CD-ROM), an optical memory, a magnet memory, or any suitable combination of the above.

To provide interaction with a user, the system and technology described herein may be implemented on a computer, the computer including: a display device (for example, a CRT (cathode ray tube) or LCD (liquid crystal display) monitor) for displaying information to the user); and a keyboard and a pointing device (for example, a mouse or a trackball) through which the user can provide input to the computer. Other types of devices may also be used to provide interaction with the user, for example, the feedback provided to the user may be any form of sensory feedback (for example, visual feedback, auditory feedback, or tactile feedback); and may be in any form (including acoustic input, voice input, or tactile input) to receive input from the user.

The system and technology described herein may be implemented on a computing system including back-end components (for example, serving as a data server), or a computing system including middleware components (for example, an application server), or a computing system including front-end components (for example, a user computer having a graphical user interface or a web browser through which the user can interact with the embodiments of the system and technology described herein), or a computing system including any combination of such back-end components, middleware components, or front-end components. The components of the system may be interconnected by any form or medium of digital data communication (for example, a communication network). Examples of the communication network include: a Local Area Network (LAN), a Wide Area Network (WAN), and the Internet.

The computer system may include a client and a server. The client and the server are generally remote from each other and usually interact through a communication network. The relationship between the client and the server is generated by virtue of computer programs running on corresponding computers and having a client-server relationship to each other. The server may be a cloud server, a distributed system server, or a server combined with a blockchain.

It should be understood that various forms of processes shown above may be used to reorder, add, or delete steps. For example, the steps described in embodiments of the present disclosure may be performed in parallel, sequentially, or in different orders, as long as the desired results of the technical solution disclosed in embodiments of the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for training a speech recognition model, the method comprising:
    determining a plurality of feature vectors based on audio feature data corresponding to a first target frame in a sample speech, wherein the sample speech comprises a conversation among a plurality of objects and the sample speech has a corresponding sample text;
    generating a predicted text element corresponding to the first target frame based on an adjacent text element preceding to a text element corresponding to the first target frame in the sample text, wherein the text element and the adjacent text element are targeting at a target object in the plurality of objects;
    obtaining a first target text element based on the predicted text element and a first feature vector in the plurality of feature vectors; and
    adjusting the speech recognition model based on the first target text element and the sample text, to obtain a trained speech recognition model, wherein the speech recognition model comprises a hybrid encoder module, a plurality of speech recognition modules, and a plurality of prediction modules; wherein the hybrid encoder module is composed of a plurality of convolutional neural network (CNN) layers and one max-pooling layer, and the hybrid encoder processes the audio feature data to obtain intermediate features including features of speech content and speaker's information related to the speech content;

wherein during training, the sample speech is divided into frames, and 80-dimensional Mel-Frequency Cepstral Coefficient (MFCC), Perceptual Linear Predictive (PLP) or filter bank (Fbank) features are extracted from each frame, and after first-order difference calculation and second-order difference calculation and then regularization, 80*3-dimensional features are extracted from each audio frame; the 80*3-dimensional features are input into the hybrid encoder to obtain the intermediate features, and the intermediate features are input into speaker dependent, SD, encoders respectively, so as to extract the plurality of feature vectors.

2. The method according to claim 1, wherein generating the predicted text element corresponding to the first target frame based on the adjacent text element preceding to the text element corresponding to the first target frame in the sample text comprises:
determining, in the sample text, the text element corresponding to the first target frame, and determining the target object corresponding to the text element;
determining, in the sample text, the adjacent text element corresponding to the target object and preceding to the text element corresponding to the target object; and
applying the adjacent text element to a first prediction module in the plurality of prediction modules, to generate the predicted text element.

3. The method according to claim 1, wherein adjusting the speech recognition model based on the first target text element and the sample text comprises:
obtaining a second target text element corresponding to a second target frame in the sample speech; and
adjusting the speech recognition model based on the first target text element, the second target text element, and the sample text.

4. The method according to claim 1, further comprising:
obtaining a target speech;
annotating the target speech with identifiers of objects in the plurality of objects;
pre-processing the annotated speech to obtain the sample speech; and
extracting the audio feature data of the first target frame in the sample speech.

5. The method according to claim 4, further comprising:
determining a sample text corresponding to the target speech.

6. A method for processing speech data by using the speech recognition model trained according to the method of claim 1, comprising:
obtaining a speech to be recognized;
extracting audio feature data for at least one frame in the speech to be recognized; and
applying the audio feature data to the speech recognition model, to determine a text corresponding to the speech to be recognized.

7. An apparatus for training a speech recognition model, the apparatus comprising:
at least one processor; and
a memory connected to the at least one processor by communication, wherein the memory stores instructions executable by the at least one processor, and the instructions, when executed by the at least one processor, cause the at least one processor to perform operations, the operations comprising:
determining a plurality of feature vectors based on audio feature data corresponding to a first target frame in a sample speech, wherein the sample speech comprises a conversation among a plurality of objects and the sample speech has a corresponding sample text;
generating a predicted text element corresponding to the first target frame based on an adjacent text element preceding to a text element corresponding to the first target frame in the sample text, wherein the text element and the adjacent text element are targeting at a target object in the plurality of objects;
obtaining a first target text element based on the predicted text element and a first feature vector in the plurality of feature vectors; and
adjusting the speech recognition model based on the first target text element and the sample text, to obtain a trained speech recognition model,
wherein the speech recognition model comprises a hybrid encoder module, a plurality of speech recognition modules, and a plurality of prediction modules; wherein the hybrid encoder module is composed of a plurality of convolutional neural network (CNN) layers and one max-pooling layer, and the hybrid encoder processes the audio feature data to obtain intermediate features including features of speech content and speaker's information related to the speech content;
wherein during training, the sample speech is divided into frames, and 80-dimensional Mel-Frequency Cepstral Coefficient (MFCC), Perceptual Linear Predictive (PLP) or filter bank (Fbank) features are extracted from each frame, and after first-order difference calculation and second-order difference calculation and then regularization, 80*3-dimensional features are extracted from each audio frame; the 80*3-dimensional features are input into the hybrid encoder to obtain the intermediate features, and the intermediate features are input into speaker dependent, SD, encoders respectively, so as to extract the plurality of feature vectors.

8. The apparatus according to claim 7, wherein generating the predicted text element corresponding to the first target frame based on the adjacent text element preceding to the text element corresponding to the first target frame in the sample text comprises:
determining, in the sample text, the text element corresponding to the first target frame, and determining the target object corresponding to the text element;
determining, in the sample text, the adjacent text element corresponding to the target object and preceding to the text element corresponding to the target object; and
applying the adjacent text element to a first prediction module in the plurality of prediction modules, to generate the predicted text element.

9. The apparatus according to claim 7, wherein adjusting the speech recognition model based on the first target text element and the sample text comprises:
obtaining a second target text element corresponding to a second target frame in the sample speech; and
adjusting the speech recognition model based on the first target text element, the second target text element, and the sample text.

10. The apparatus according to claim 7, wherein the operations further comprise
obtaining a target speech;
annotating the target speech with identifiers of objects in the plurality of objects;
pre-processing the annotated speech to obtain the sample speech; and
extracting the audio feature data of the first frame in the sample speech.

11. The apparatus according to claim 10, wherein the operations further comprise:
determining a sample text corresponding to the target speech.

12. An apparatus for processing speech data, comprising:
the speech recognition model trained according to the method of claim 1;
at least one processor; and
a memory connected to the at least one processor by communication,
wherein the memory stores instructions executable by the at least one processor, and the instructions, when executed by the at least one processor, cause the at least one processor to perform operations, the operations comprising:
obtaining a speech to be recognized;
extracting audio feature data for at least one frame in the speech to be recognized; and
a text determination module, configured to apply the audio feature data to the speech recognition model, to determine a text corresponding to the speech to be recognized.

13. An apparatus for training a speech recognition model, the apparatus comprising: at least one processor; and a memory connected to the at least one processor by communication, wherein the memory stores instructions executable by the at least one processor, and the instructions, when executed by the at least one processor, cause the at least one processor to perform operations, the operations comprising:
determining a plurality of feature vectors based on audio feature data corresponding to a first target frame in a sample speech, wherein the sample speech comprises a conversation among a plurality of objects and the sample speech has a corresponding sample text;
generating a predicted text element corresponding to the first target frame based on an adjacent text element preceding to a text element corresponding to the first target frame in the sample text, wherein the text element and the adjacent text element are targeting at a target object in the plurality of objects;
obtaining a first target text element based on the predicted text element and a first feature vector in the plurality of feature vectors; and
adjusting the speech recognition model based on the first target text element and the sample text, to obtain a trained speech recognition model,
wherein the speech recognition model comprises a hybrid encoder module, a plurality of speech recognition modules, and a plurality of prediction modules; wherein the hybrid encoder module is composed of a plurality of convolutional neural network (CNN) layers and one max-pooling layer, and the hybrid encoder processes the audio feature data to obtain intermediate features including features of speech content and speaker's information related to the speech content;
wherein during training, the sample speech is divided into frames, and 80-dimensional Mel-Frequency Cepstral Coefficient (MFCC), Perceptual Linear Predictive (PLP) or filter bank (Fbank) features are extracted from each frame, and after first-order difference calculation and second-order difference calculation and then regularization, 80*3-dimensional features are extracted from each audio frame; the 80*3-dimensional features are input into the hybrid encoder to obtain the intermediate features, and the intermediate features are input into speaker dependent, SD, encoders respectively, so as to extract the plurality of feature vectors.

\* \* \* \* \*

UNITED STATES PATENT AND TRADEMARK OFFICE
CERTIFICATE OF CORRECTION

PATENT NO. : 12,100,388 B2
APPLICATION NO. : 17/747732
DATED : September 24, 2024
INVENTOR(S) : Qingen Zhao It is certified that error appears in the above-identified patent and that said Letters Patent is hereby corrected as shown below:

In the Claims

Starting in Column 17, Line 33, cancel the text beginning with "13. An apparatus for training a speech recognition model," to and ending in Column 18, Line 37, ending with, "so as to extract the plurality of feature vectors." and insert the following claim:
-- 13. A non-transitory computer-readable storage medium storing computer instructions, wherein the computer instructions, when executed by a computer, cause the computer to perform operations, the operations comprising:
    determining a plurality of feature vectors based on audio feature data corresponding to a first target frame in a sample speech, wherein the sample speech comprises a conversation among a plurality of objects and the sample speech has a corresponding sample text;
    generating a predicted text element corresponding to the first target frame based on an adjacent text element preceding to a text element corresponding to the first target frame in the sample text, wherein the text element and the adjacent text element are targeting at a target object in the plurality of objects;
    obtaining a first target text element based on the predicted text element and a first feature vector in the plurality of feature vectors; and
    adjusting a speech recognition model based on the first target text element and the sample text, to obtain a trained speech recognition model,
    wherein the speech recognition model comprises a hybrid encoder module, a plurality of speech recognition modules, and a plurality of prediction modules; wherein the hybrid encoder module is composed of a plurality of convolutional neural network (CNN), layers and one max-pooling layer, and the hybrid encoder processes the audio feature data to obtain intermediate features including features of speech content and speaker's information related to the speech content;
    wherein during training, the sample speech is divided into frames, and 80-dimensional Mel-Frequency Cepstral Coefficient (MFCC), Perceptual Linear Predictive (PLP) or filter bank (Fbank) features are extracted from each frame, and after first-order difference calculation and second-order difference calculation and then regularization, 80*3-dimensional features are extracted from each audio frame; the 80*3-dimensional features are input into the hybrid encoder to obtain the Signed and Sealed this
Thirty-first Day of December, 2024

Derrick Brent
*Acting Director of the United States Patent and Trademark Office* intermediate features, and the intermediate features are input into speaker dependent, SD, encoders respectively, so as to extract the plurality of feature vectors. --.